United States Patent [19]
Lamm et al.

[11] Patent Number: 5,834,602
[45] Date of Patent: Nov. 10, 1998

[54] ACID DISAZO DYES

[75] Inventors: Gunther Lamm, Hassloch; Helmut Reichelt, Neustadt, both of Germany

[73] Assignee: BASF Aktiengesellschaft, Ludwigshafen, Germany

[21] Appl. No.: 983,326

[22] PCT Filed: Aug. 5, 1996

[86] PCT No.: PCT/EP96/03439

§ 371 Date: Jan. 26, 1998

§ 102(e) Date: Jan. 26, 1998

[87] PCT Pub. No.: WO97/07168

PCT Pub. Date: Feb. 27, 1997

[30] Foreign Application Priority Data

Aug. 17, 1995 [DE] Germany ............... 195 30 176.5

[51] Int. Cl.$^6$ .............. C09B 31/10; D06P 3/24; D06P 3/32
[52] U.S. Cl. .......... 534/670; 534/797; 534/827; 8/437; 8/924; 8/681
[58] Field of Search .................. 534/670, 827, 534/797, 437, 402

[56] References Cited

U.S. PATENT DOCUMENTS

| | | | |
|---|---|---|---|
| 4,479,906 | 10/1984 | Zeidler et al. | 534/680 |
| 4,784,668 | 11/1988 | Breitschaft et al. | 8/437 |

FOREIGN PATENT DOCUMENTS

| | | |
|---|---|---|
| 2206359 | 6/1974 | France . |
| 2415690 | 10/1975 | Germany . |
| 2416670 | 10/1975 | Germany . |

Primary Examiner—Fiona T. Powers
Attorney, Agent, or Firm—Oblon, Spivak, McClelland, Maier & Neustadt, P.C.

[57] ABSTRACT

Disazo dyes of the formula

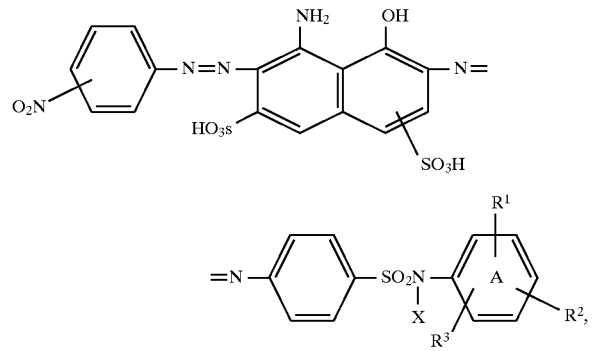

where
the ring A may be benzofused,
X is hydrogen or $C_1$–$C_4$-alkyl,
$R^1$ is hydrogen, $C_1$–$C_4$-alkyl, halogen, carboxyl, $C_1$–$C_4$-alkoxycarbonyl or hydroxysulfonyl,
$R^2$ is hydrogen, $C_1$–$C_4$-alkyl, halogen, carboxyl or $C_1$–$C_4$-alkoxycarbonyl, or $R^1$ and $R^2$ together are a radical of the formula L—NZ—CO, where L is methylene or carbonyl and Z is substituted or unsubstituted $C_1$–$C_4$-alkyl or substituted or unsubstituted phenyl, and
$R^3$ is hydrogen, $C_1$–$C_4$-alkyl, hydroxyl, $C_1$–$C_4$-alkoxy, phenoxy, $C_1$–$C_4$-alkanoyloxy or benzoyloxy,
are useful for dyeing natural or synthetic substrates.

13 Claims, No Drawings

ACID DISAZO DYES

This application is a 371 of PCT/EP96/03439 filed Aug. 5,1996.

The present invention relates to novel disazo dyes of the formula I

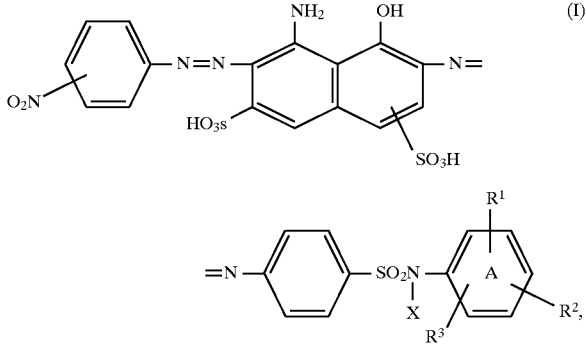

where
the ring A may be benzofused,
  X is hydrogen or $C_1$–$C_4$-alkyl,
  $R^1$ is hydrogen, $C_1$–$C_4$-alkyl, halogen, carboxyl, $C_1$–$C_4$-alkoxy-carbonyl or hydroxysulfonyl,
  $R^2$ is hydrogen, $C_1$–$C_4$-alkyl, halogen, carboxyl or $C_1$–$C_4$-alkoxy-carbonyl, or $R^1$ and $R^2$ together are a radical of the formula L—NZ—CO, where L is methylene or carbonyl and Z is $C_1$–$C_4$-alkyl with or without $C_1$–$C_4$-alkoxy substitution or unsubstituted or $C_1$–$C_4$-alkyl- or $C_1$–$C_4$-alkoxy-substituted phenyl, and
  $R^3$ is hydrogen, $C_1$–$C_4$-alkyl, hydroxyl, $C_1$–$C_4$-alkoxy, phenoxy, $C_1$–$C_4$-alkanoyloxy or benzoyloxy,
and also to their use for dyeing natural or synthetic substrates.

It is an object of the present invention to provide novel disazo-class acid dyes having advantageous application properties.

We have found that this object is achieved by the above-defined disazo dyes of the formula I.

Any alkyl appearing in the abovementioned formula I can be straight-chain or branched.

$R^1$, $R^2$, $R^3$, X and Z are each for example methyl, ethyl, propyl, isopropyl, butyl, isobutyl, sec-butyl or tert-butyl.

$R^1$ and $R^2$ may each also be for example fluorine, chlorine, bromine, methoxycarbonyl, ethoxycarbonyl, propoxycarbonyl, isopropoxycarbonyl or butoxycarbonyl.

Z may also be for example 2-methoxyethyl, 2-ethoxyethyl, 2-propoxyethyl, 2-isopropoxyethyl, 2-butoxyethyl, 2- or 3-methoxypropyl, 2- or 3-ethoxypropyl, 2- or 3-propoxybutyl, 2- or 3-butoxypropyl, 2- or 4-methoxybutyl, 2- or 4-ethoxybutyl, 2- or 4-propoxybutyl, 2- or 4-butoxybutyl, phenyl, 2-, 3- or 4-methylphenyl, 2,4-dimethylphenyl, 2-, 3- or 4-methoxyphenyl or 2,4-dimethoxyphenyl.

$R^3$ may also be for example methoxy, ethoxy, propoxy, isopropoxy, butoxy, isobutoxy, sec-butoxy, formyloxy, acetyloxy, propionyloxy, butyryloxy or isobutyryloxy.

Since the disazo dyes of the formula I contain a plurality of hydroxysulfonyl groups, their salts are also covered by the invention.

Suitable salts here are metal or ammonium salts. Metal salts are, in particular, the lithium, sodium or potassium salts. For the purposes of the present invention, ammonium salts are taken to mean salts which contain either unsubstituted or substituted ammonium cations. Examples of substituted ammonium cations are monoalkyl-, dialkyl-, trialkyl-, tetraalkyl- or benzyltrialkyl-ammonium cations or cations which are derived from five- or six-membered, saturated, nitrogen-containing heterocyclic rings, such as pyrrolidinium, piperidinium, morpholinium or piperazinium cations, or N-monoalkyl- or N,N-dialkyl-substituted products thereof. Alkyl here is generally taken to mean straight-chain or branched $C_1$–$C_{20}$-alkyl, which may be substituted by 1 or 2 hydroxyl groups and/or interrupted by 1 to 4 oxygen atoms in ether function.

Preference is given to disazo dyes of the formula Ia

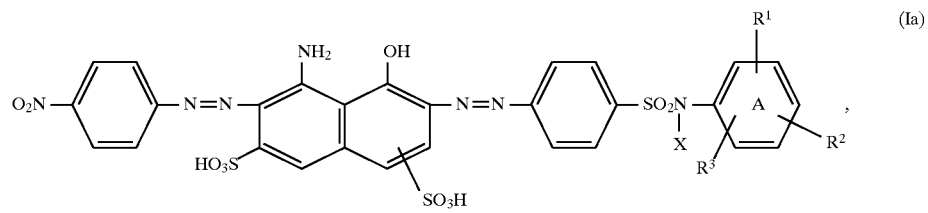

where the ring A, X, $R^1$, $R^2$ and $R^3$ are each as defined above.

Preference is further given to disazo dyes of the formula Ib

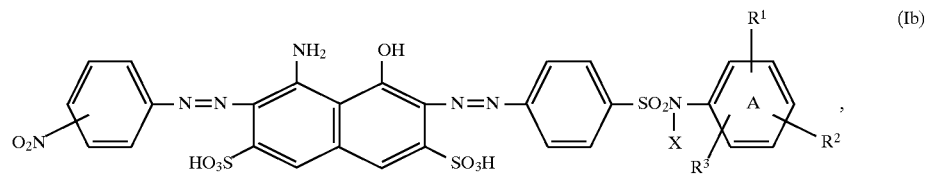

where the ring A, X, $R^1$, $R^2$ and $R^3$ are each as defined above.

Preference is further given to disazo dyes of the formula I where $R^1$ is hydrogen, methyl, carboxyl, $C_1$- or $C_2$-alkoxycarbonyl or hydroxysulfonyl.

Preference is further given to disazo dyes of the formula I where $R^2$ is hydrogen, methyl, carboxyl or $C_1$- or $C_2$-alkoxycarbonyl.

Preference is further given to disazo dyes of the formula I where $R^3$ is hydrogen or hydroxyl.

Preference is further given to disazo dyes of the formula I where the ring A is not benzofused.

Preference is further given to disazo dyes of the formula I where at least one of $R^1$, $R^2$ and $R^3$ is not hydrogen.

Preference is further given to disazo dyes of the formula I where X is hydrogen.

Particular preference is given to disazo dyes of the formula I where $R^3$ is hydroxyl.

Very particular preference is given to disazo dyes of the formula I where $R^1$ and $R^2$ are each hydrogen and $R^3$ is hydroxyl.

Of particular technical interest are disazo dyes of the formula Ic

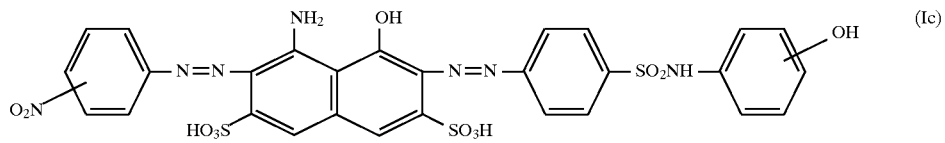

and the dye of the formula Id

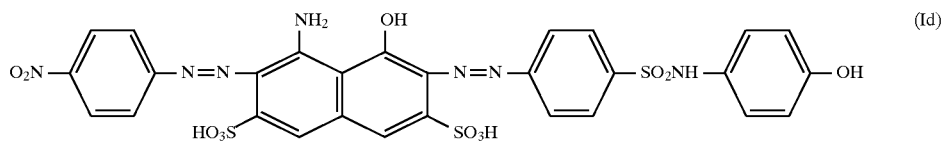

may be singled out in particular.

The novel disazo dyes of the formula I can be obtained by methods known per se.

For instance, by first diazotizing nitroaniline and coupling the resulting diazonium salt with 1-hydroxy-8-aminonaphthalene-3,6- or -4,6-disulfonic acid.

The resulting monoazo dye of the formula II

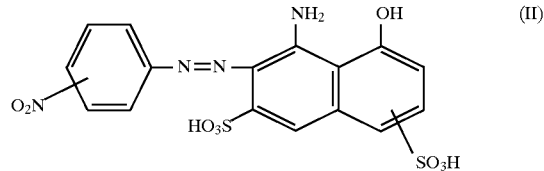

can then be coupled, again in a manner known per se, with a diazonium salt which can be obtained by conventional diazotization of a sulfonyl compound of the formula III

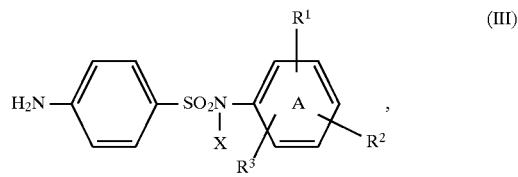

where the ring A, $R^1$, $R^2$, $R^3$ and X are each as defined above, to obtain the disazo dyes of the formula I.

The novel disazo dyes of the formula I are advantageously useful for dyeing natural or synthetic substrates, for example wool, leather or polyamide. They are particularly suitable for dyeing leather.

The dyeings obtained have greenish to reddish blue hues and good migration and wet fastness properties.

The novel dyes can be used not only alone but also mixed with one another or with other dyes.

The novel dyes are further suitable for the ink-jet method (paper and textiles).

The Examples which follow illustrate the invention.

EXAMPLE 1

42 g of the diazo component of the formula

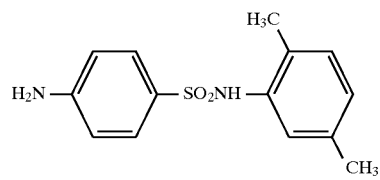

were stirred at from 45° to 50° C. in 90 ml of 18.5% strength by weight hydrochloric acid for 2 h. The mixture was then cooled down with ice to 0° C., and 47 ml of 23% strength by weight aqueous sodium nitrite solution were added dropwise over 5 min during which the temperature was held at max. 5° C. The mixture was subsequently stirred for 1 h, excess nitrous acid was destroyed, and then 70.2 g of the coupling component of the formula

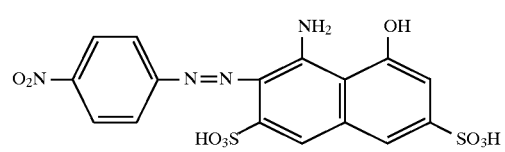

were added.

The mixture was then adjusted to pH 9.5–10 with ice-cold, dilute sodium hydroxide solution. Acid freed by the coupling was neutralized with sodium carbonate. The mixture was stirred over-night at a pH from 9 to 10. The mixture was then heated to 70°–75° C., the pH was adjusted to 6, and the dye was precipitated with sodium chloride.

Isolation in a conventional manner, drying and grinding gave 133 g of a black powder which gives a blue solution in water. The UV-VIS spectrum of the solution has a maximum at 605 nm at about pH 4.

The dye has the formula

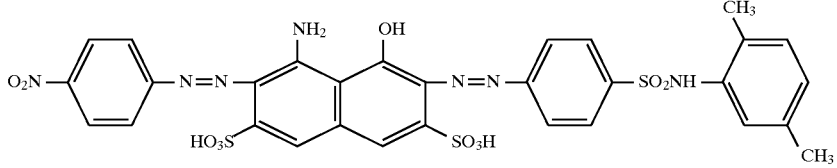

The affinity for leather, wool and polyamide is excellent.

EXAMPLE 2

57 g of the diazo component of the formula

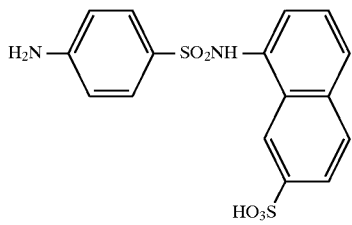

were stirred overnight in 150 ml of 18.5% strength by weight hydrochloric acid. The mixture was then cooled down with ice to 0° C., and 48 ml of 23% strength by weight aqueous sodium nitrite solution were added dropwise over 30 min. The mixture was subsequently stirred at fom 0° to 5° C. for 2 h, excess nitrous acid was destroyed, and then 70.2 g of the coupling component mentioned in Example 1 were added. The pH of the coupling mixture was raised to 7 with dilute, ice-cold sodium hydroxide solution, the mixture was subsequently stirred at that pH for 30 min, and then the pH was adjusted to 8–8.5 with sodium carbonate and the mixture was stirred overnight. Thereafter the mixture was heated to 70° C., subsequently stirred at that temperature for 1 h and-then admixed with concentrated hydrochloric acid to precipitate the dye of the formula

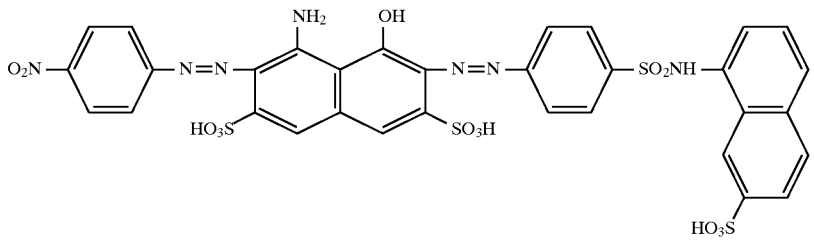

which was filtered off hot.

Drying and grinding gave 150 g of a black powder. The powder gives a dark blue solution in water under neutral conditions; at about pH 4 the UV-VIS spectrum of the aqueous solution has a maximum at 608 nm.

The dye dyes wool in a navy shade having good light fastness. The dyeing liquors of leather dyeings are exhausted; and the leather is dyed in a deep blue shade.

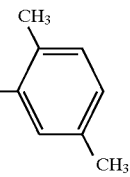

EXAMPLE 3

44.5 g of the diazo component of the formula

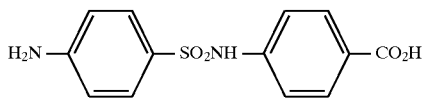

were stirred up with 150 ml of 18.5% strength by weight hydrochloric acid and diluted with 150 ml of cold water. The mixture was then cooled down to 0° C., and 48 ml of 23% strength by weight. aqueous sodium nitrite solution were added dropwise over 30 min. The mixture was subsequently stirred at from from 0° to 5° C. for 2.5 h, excess nitrous acid was destroyed, and then 70.2 g of the coupling component mentioned in Example 1 were added. The reaction mixture was then adjusted to pH 7 with ice-cold, dilute sodium hydroxide solution. The pH was subsequently raised to 8–8.5 with sodium carbonate, and the mixture was stirred overnight. Thereafter it was heated to 75° C., and the dye was precipitated by acidification with hydrochloric acid and filtered off hot with suction.

Drying and grinding gave 130 g of a black powder which dyes wool and polyamide in navy shades. Leather is dyed a deep blue having good migration fastness.

The dyeings on wool have excellent light fastness. The UV-VIS spectrum in water has a maximum at 603 nm at about pH 4. The dye has the following formula:

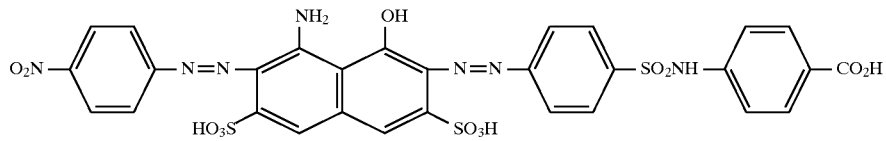

EXAMPLE 4

40 g of the diazo component of the formula

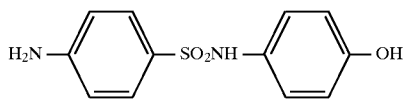

were diazotized similarly to Example 1. The resulting diazonium salt suspension was admixed with 70.2 g of the coupling component mentioned in Example 1, which had been dissolved in water at pH 7.5. The pH of the coupling mixture was adjusted to 7.5 with sodium carbonate. The mixture was subsequently stirred for 1 h and then adjusted to pH 9–10. Thereafter it was acidified to pH 4.

The precipitated dye of the formula

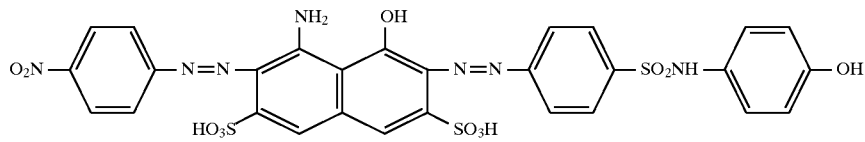

was filtered off with suction, dried and ground to leave 145 g of a black powder. The dye contains about 8% by weight of sodium chloride. It dyes leather in a blue shade having good migration fastness. The UV-VIS spectrum of an aqueous solution at about pH 4 has a maximum at 597 nm.

The below-recited dyes are prepared similarly to Examples 1 to 4:

| No. | $Y^1$ | $Y^2$ | $Y^3$ | Hue |
|---|---|---|---|---|
| 5 | H | $SO_3H$ | H | blue |
| 6 | H | H | $SO_3H$ | blue |
| 7 | $SO_3H$ | OH | H | blue |
| 8 | $CH_3$ | OH | H | blue |
| 9 | $OCH_3$ | H | H | blue |
| 10 | $CO_2H$ | H | H | blue |
| 11 | H | H | $CO_2H$ | blue |
| 12 | $CH_3$ | $CH_3$ | H | blue |
| 13 | H | $CO_2H$ | $CO_2H$ | blue |
| 14 | H | $OCH_3$ | H | blue |
| 15 | H | $OCOCH_3$ | H | blue |
| 16 | H | $OC_6H_5$ | H | blue |
| 17 | H | $CH_3$ | $SO_3H$ | blue |
| 18 | $SO_3H$ | $CH_3$ | $CH_3$ | blue |
| 19 | $CH_3$ | $SO_3H$ | $CH_3$ | blue |
| 20 | H | OH | $CO_2H$ | blue |

-continued

21 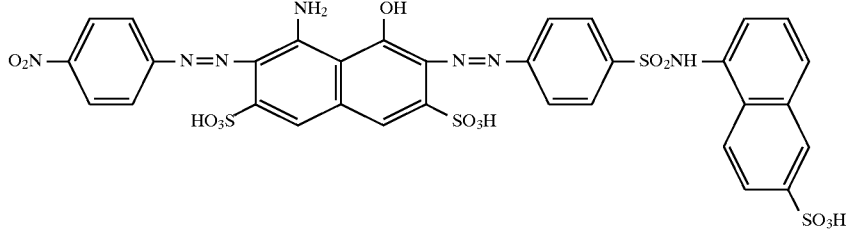

22 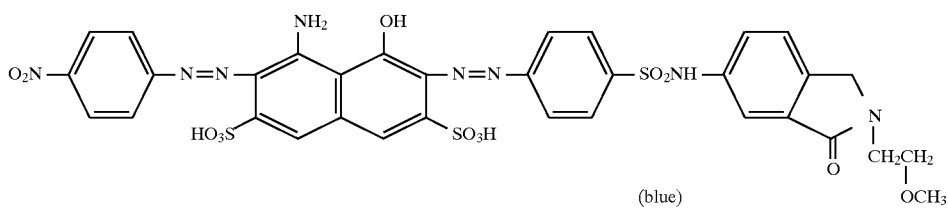
(blue)

23 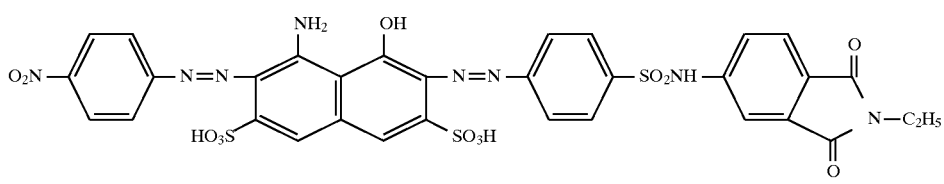
(blue)

24 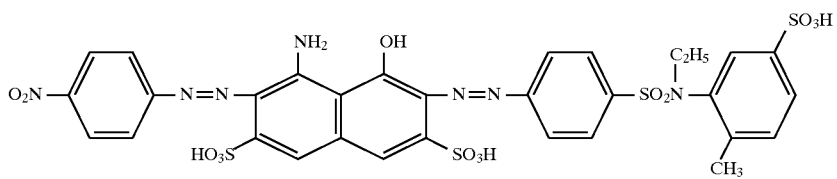

25 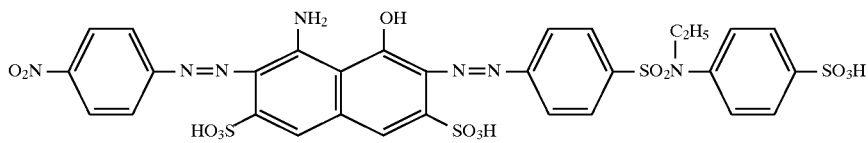

We claim:
1. A disazo dye of the formula I

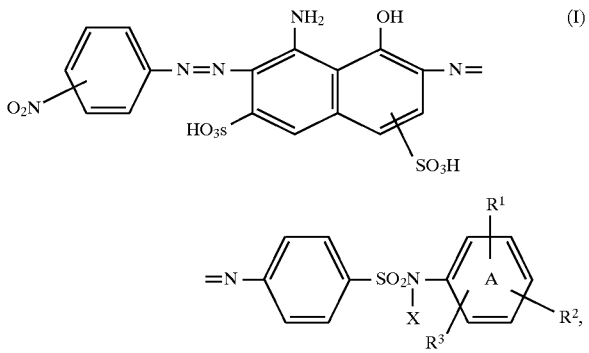

where
the ring A may be benzofused,
X is hydrogen or $C_1$–$C_4$-alkyl,
$R^1$ is hydrogen, $C_1$–$C_4$-alkyl, halogen, carboxyl, $C_1$–$C_4$-alkoxycarbonyl or hydroxysulfonyl,
$R^2$ is hydrogen, $C_1$–$C_4$-alkyl, halogen, carboxyl or $C_1$–$C_4$-alkoxycarbonyl, or $R^1$ and $R^2$ together are a radical of the formula L—NZ—CO, where L is methylene or carbonyl and Z is $C_1$–$C_4$-alkyl with or without $C_1$–$C_4$-alkoxy substitution or unsubstituted or $C_1$–$C_4$-alkyl- or $C_1$–$C_4$-alkoxy-substituted phenyl, and
$R^3$ is hydrogen, $C_1$–$C_4$-alkyl, hydroxyl, $C_1$–$C_4$-alkoxy, phenoxy, $C_1$–$C_4$-alkanoyloxy or benzoyloxy.

2. The disazo dye as claimed in claim 1, of the formula Ia

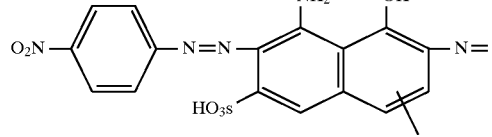

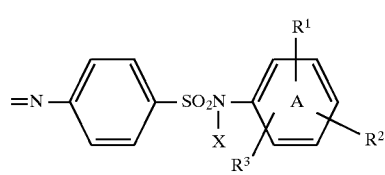

where the ring A, X, $R^1$, $R^2$ and $R^3$ are each as defined in claim 1.

3. The disazo dye as claimed in claim 1, of the formula Ib

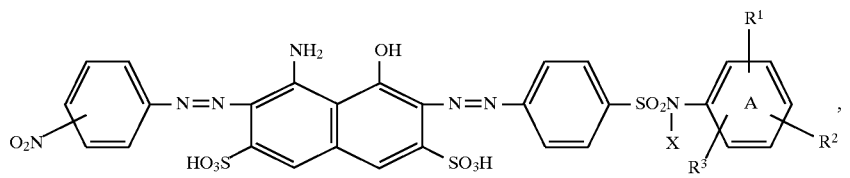

where the ring A, X, $R^1$, $R^2$ and $R^3$ are each as defined in claim 1.

4. The disazo dye as claimed in claim 1, wherein $R^1$ is hydrogen, methyl, carboxyl, $C_1$- or $C_2$-alkoxycarbonyl or hydroxysulfonyl.

5. The disazo dye as claimed in claim 1, wherein $R^2$ is hydrogen, methyl, carboxyl or $C_1$- or $C_2$-alkoxycarbonyl.

6. The disazo dye as claimed in claim 1, wherein $R^3$ is hydrogen or hydroxyl.

7. The disazo dye as claimed in claim 1, wherein the ring A is not benzofused.

8. The disazo dye as claimed in claim 1, wherein at least one of $R^1$, $R^2$ and $R^3$ is not hydrogen.

9. The disazo dye as claimed in claim 1, wherein X is hydrogen.

10. A method of dyeing a natural or synthetic substrate, which comprises applying to said natural or synthetic substrate one or more of the disazo dyes of claim 1.

11. The method of claim 10, wherein said natural substrate is selected from the group consisting of wool and leather.

12. The method of claim 11, wherein said natural substrate is leather.

13. The method of claim 10, wherein said synthetic substrate is polyamide.

* * * * *